United States Patent
Zhang et al.

(10) Patent No.: US 7,541,976 B2
(45) Date of Patent: Jun. 2, 2009

(54) SYSTEM AND/OR METHOD FOR ESTIMATING SPEED OF A TRANSMITTING OBJECT

(75) Inventors: Hong Zhang, Edison, NJ (US); Ali Abdi, New Milford, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 129 days.

(21) Appl. No.: 11/551,685

(22) Filed: Oct. 20, 2006

(65) Prior Publication Data

US 2007/0126636 A1 Jun. 7, 2007

Related U.S. Application Data

(63) Continuation-in-part of application No. 11/336,301, filed on Jan. 20, 2006.

(60) Provisional application No. 60/645,577, filed on Jan. 20, 2005.

(51) Int. Cl.
*G01S 3/02* (2006.01)
(52) U.S. Cl. .................. 342/461; 342/377; 342/378
(58) Field of Classification Search ............... 342/461, 342/368–378; 702/142
See application file for complete search history.

(56) References Cited

U.S. PATENT DOCUMENTS

| | | | | |
|---|---|---|---|---|
| 3,393,400 A * | 7/1968 | Trott | ............ | 367/13 |
| 4,244,026 A * | 1/1981 | Dickey, Jr. | ............ | 367/89 |
| 5,694,416 A * | 12/1997 | Johnson | ............ | 342/368 |
| 5,790,413 A | 8/1998 | Bartusiak et al. | | |
| 6,091,361 A * | 7/2000 | Davis et al. | ............ | 342/378 |
| 6,124,832 A * | 9/2000 | Jeon et al. | ............ | 342/375 |
| 6,542,745 B1 | 4/2003 | Mottler et al. | | |
| 6,600,824 B1 * | 7/2003 | Matsuo | ............ | 381/92 |
| 2002/0067845 A1 * | 6/2002 | Griffis | ............ | 382/107 |
| 2002/0131537 A1 | 9/2002 | Storm et al. | | |
| 2004/0165479 A1 * | 8/2004 | Scoca et al. | ............ | 367/100 |
| 2005/0125169 A1 * | 6/2005 | Loose | ............ | 702/45 |
| 2005/0282499 A1 | 12/2005 | Park et al. | | |
| 2006/0171255 A1 * | 8/2006 | Zhu et al. | ............ | 367/89 |
| 2007/0285315 A1 * | 12/2007 | Davis et al. | ............ | 342/377 |

FOREIGN PATENT DOCUMENTS

WO WO 2004043891 A1 * 5/2004

OTHER PUBLICATIONS

R.D. Keane et al., Theory of cross-correlation analysis of PIV images, Applied Scientific Research, vo. 49, p. 191-215, 1992.*

(Continued)

*Primary Examiner*—Thomas H Tarcza
*Assistant Examiner*—Fred H Mull
(74) *Attorney, Agent, or Firm*—Connolly Bove Lodge & Hutz LLP

(57) ABSTRACT

The subject matter disclosed herein relates to techniques for estimating a speed of an object that transmits a signal at a carrier frequency. An apparatus and method disclosed herein includes receiving at an array of multiple antenna elements a radio frequency signal transmitted by a moving object; and estimating a speed of said moving object based, at least in part, on a spatial cross-correlation among characteristics of signals received at individual ones of said multiple antenna elements.

35 Claims, 4 Drawing Sheets

OTHER PUBLICATIONS

W.-Q. Zhu et al., Theoretical model and error analysis of acoustic correlation current profiler (ACCP), Oceans '99 MTS/IEEE. Riding the Crest into the 21st Century, vol. 1, p. 382-385, Sep. 1999.*

A. Dogandzic et al., Cramer-Rao bounds for estimating range, velocity, and direction with an active array, IEEE Transactions Signal Processing, vol. 49(6), p. 1122-1137, Jun. 2001.*

A. Abdi et al., A versatile spatio-temporal correlation function for mobile fading channels with non-isotropic scattering, Proceedings of the Tenth IEEE Workshop on Statistical Signal and Array Processing, p. 58-62, Aug. 2000.*

J. Ward, Space-Time Adaptive Processing for Airborne Radar, IEE Colloquium on Space-Time Adaptive Processing, p. 2809-2812, Apr. 1998.*

PCT International Search Report and International Preliminary Report on Patentability, PCT/IB07/50190, dated Sep. 2, 2008.

* cited by examiner

SYSTEM AND/OR METHOD FOR ESTIMATING SPEED OF A TRANSMITTING OBJECT

CROSS-REFERENCE TO RELATED APPLICATIONS

This is a continuation-in-part of U.S. patent application Ser. No. 11/336,301, filed on Jan. 20, 2006, which claims the benefit of U.S. Provisional Patent Application Ser. No. 60/645,577, filed on Jan. 20, 2005, assigned to the assignee of claimed subject matter.

BACKGROUND

1. Field

The subject matter disclosed herein relates to estimating a speed associated with a transmitting object.

2. Information

Accurate estimation of a speed of a mobile object is desirable for monitoring wireless communication channel variations for particular activities such as, for example, handoff, adaptive modulation, equalization, power control and or the like (see, e.g., Zhang and A. Abdi, "A Robust Mobile Speed Estimator in Fading Channels: Performance Analysis and Experimental Results," Proc. IEEE Global Telecommun. Conf., St. Louis, Mo., 2005, hereinafter "[1]", and G. L. Stuber, Principles of Mobile Communication, 2nd ed., Boston, Mass.: Kluwer, 2001, hereinafter "[2]", and citations therein). Compared with conventional speed estimators, techniques proposed in [1], are not only robust against the noise, including both Gaussian and impulsive non-Gaussian, but also insensitive to nonisotropic scattering observed at a mobile station.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
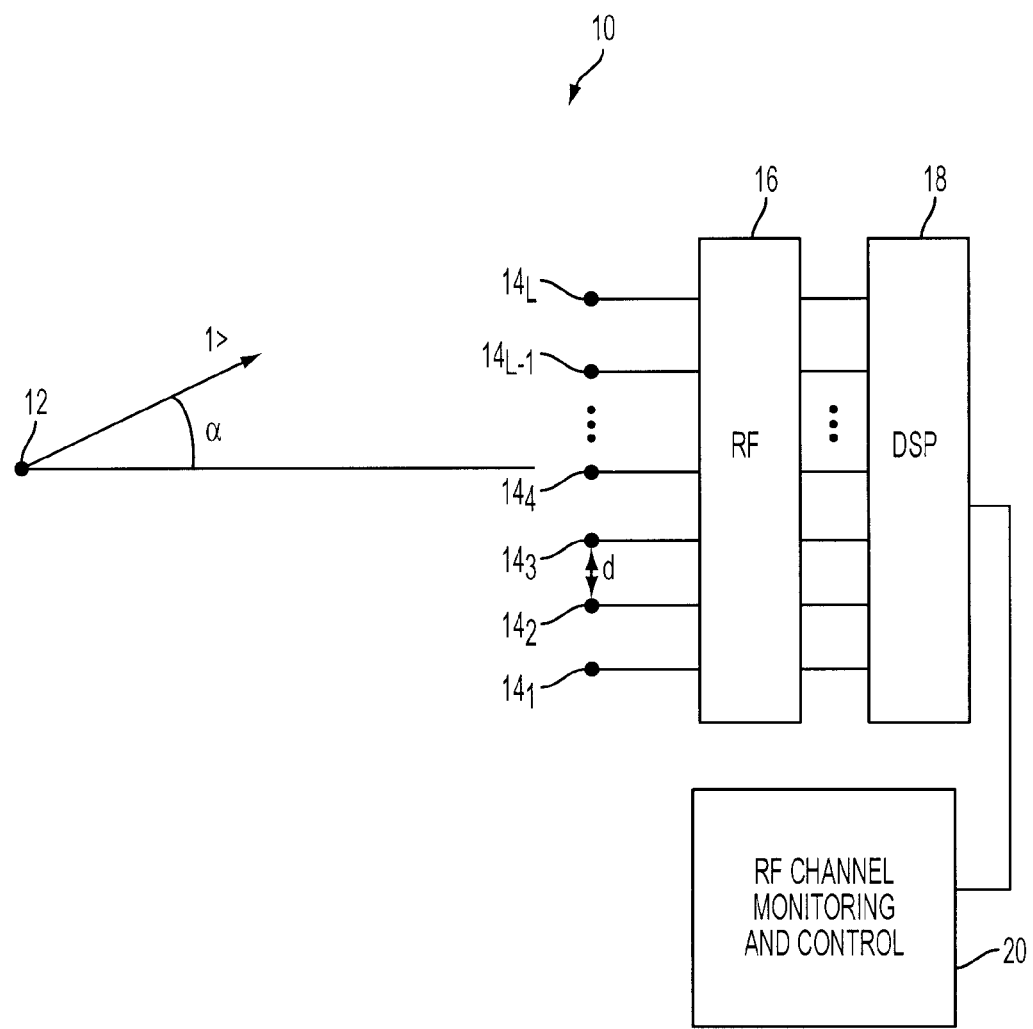
FIG. 1 is a schematic diagram of a system to estimate a speed of an object transmitting a signal at a known carrier frequency according to a particular embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "combining," "estimating," "detecting," "deriving," "inhibiting," "rendering," "downloading," "identifying," "initiating," "querying," "obtaining," "hosting," "maintaining," "representing," "modifying," "receiving," "transmitting," "transforming," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium. Further, unless specifically stated otherwise, processes described herein, with reference to flow diagrams or otherwise, may also be executed and/or controlled, in whole or in part, by such a computing platform.

Accurately estimating a speed of a mobile station (MS) may be useful in monitoring wireless communication channel variations for particular activities such as, for example, handoff, adaptive modulation, equalization, power control and/or the like. In one embodiment, a robust speed estimator at a base station (BS) comprising multiple antenna elements may estimate speed of such an MS based, at least in part, on a spatial cross-correlation of signals received from the MS at the antenna elements. By taking advantage of such spatial information available at a space-time fading channel, an estimator according to a particular embodiment may exhibit strong robustness such as with respect to noise, nonisotropic scattering, and/or line of sight.

FIG. 1 is a schematic diagram of a system 10 to estimate a speed of an object transmitting a signal at a known carrier frequency transmitted by object 12 according to a particular embodiment. In one particular embodiment, object 12 may comprise an MS transmitting a signal at known carrier frequency $f_c$. A uniform linear antenna array may be formed of multiple antenna elements 14. In the currently illustrated embodiment, such a linear array may comprise L omnidirectional unit-gain elements with element spacing d. Such an array may be located, for example at an elevated base station (BS) of a macrocell. However, this is merely an example of how such a linear antenna array may be deployed for estimating a speed of an object and claimed subject matter is not limited in this respect.

According to an embodiment, antenna elements 14 may be installed as a linear array at a BS being operated by a service carrier providing to provide a wireless communication service to a subscriber located at object 12, comprising an MS such as a mobile cell phone, personal digital assistant and/or computing platform, for example. Here, for example, such a service carrier may enable such an MS to communicate with devices connected to the Internet through an Internet gateway (not shown) as part of an Internet service. Alternatively, such a service carrier may enable such an MS to communicate telephonically with parties through a connection to a public switched telephone network (PSTN). However, these are merely examples of how a service carrier may provide a communication service to a subscriber at a mobile station and claimed subject matter is not limited in this respect.

Object 12 may travel along a vector v in a direction according an angle of arrival (AOA) $\alpha$ which, in the particular illustrated embodiment, represents an angle between vector v and a vector normal to the linear array of elements 14. However, this is merely an example of how an AOA may be defined for an array of elements according to a particular embodiment and claimed subject matter is not limited in this respect.

According to an embodiment, RF section 16 may process signals received at antenna elements 14 by, for example, converting and/or conditioning received RF signals for downstream processing. A digital signal processing (DSP) section 18 may process such converted and/or conditioned signals from individual ones of antenna elements 14. Here, for example, DSP section 18 may perform one or more operations on such converted and/or conditioned signals such as, for example, Fast Fourier Transformations to estimate and/or measure characteristics of signals received at individual antenna elements 14. A characteristic of a signal may comprise any detectable and/or measurable attribute such as, for example, encoded information, physical signal attributes such as power, spectral attributes (e.g., carrier frequency and bandwidth), detectability in a presence of noise, modulation technique. However, these are merely examples of detectable and/or measurable attributes that may characterize a signal and claimed subject matter is not limited in this respect. In one particular embodiment, a signal characteristic may include, for example, a carrier frequency of a signal received at an antenna element, which may be shifted due at least in part to Doppler effects, arising at least in part from a speed of movement of object 12 relative to antenna elements 14. RF channels may then be monitored and/or controlled based, at least in part, on characteristics extracted at DSP section 18.

According to a particular embodiment, antenna elements 14 may experience negligible or no local scatterings, while a single transmitting antenna (not shown) at object 12 may be surrounded by local scatters. According to an embodiment, a received lowpass complex envelope at the lth element of antenna elements 14 in a noisy Ricean frequency-flat fading, in response to an unmodulated carrier signal transmitted from object 12 may be represented according to relation (1) as follows:

$$z_l(t) = s_l(t) + n_l(t) \quad (1)$$

Here, $n_l(t)$ represents additive noise, and $s_l(t)$ comprises a complex process including a random diffuse component $h_l(t)$ and a deterministic line of sight (LOS) component expressed as relation (2) according to a particular embodiment as follows:

$$s_l(t) = \sqrt{\frac{P}{K+1}} h_l(t) + \sqrt{\frac{KP}{K+1}} \exp(j2\pi f_D t \cos\alpha_0 + j\varphi_0). \quad (2)$$

In relation (2) according to a particular embodiment, $h_l(t)$ may comprise a zero-mean unit-variance complex Gaussian process, $P = E[|s_l(t)|^2]$ may represent average signal power, and Ricean factor K may comprise a ratio of LOS power to diffuse power of $h_l(t)$. In a particular embodiment, elements 14 may be assumed to receive equal power P and Ricean factor K. In an LOS component, a maximum Doppler frequency in Hz may be expressed as $f_D = s/\lambda = sf_c/c$, where s represents speed, $\lambda$ represents carrier signal wavelength, and $f_c$ represents a known carrier frequency and c represents speed of light. Additionally, $j^2 = -1$, and $\alpha_o$ and $\phi_o$ in relation (2) represent angle-of-arrival (AOA) and the phase of the LOS component at array of elements 14, respectively.

As illustrated by A. Abdi, M. Kaveh, "Parametric modeling and estimation of the spatial characteristics of a source with local scattering, in Proc. IEEE Int. Conf. Acoust., Speech, Signal Processing, Orlando, Fla., 2002, pp. 2821-2824, hereinafter "[5]", with a von Mises distribution of AOA at elements 14, a spatial-temporal cross-correlation function between the received signals at the a-th and b-th elements, defined by $C_s((b-a)\Delta, \tau) = E[s_a(t)s_b^*(t+\tau)]$ such that $\Delta = d/\lambda$ may be expressed according to relation (3) as follows:

$$C_s((b-a)\Delta, \tau) = \frac{KP}{K+1} \exp(j(u+v)\cos\alpha_0) + \frac{P}{K+1} \times \frac{I_0(\sqrt{\kappa^2 - u^2 - v^2 - 2uv + j2\kappa(u+v)\cos\alpha})}{I_0(\kappa)}, \quad (3)$$

where $u = 2\pi f_D \tau$, $v = 2\pi(a-b)\Delta$ and $1 \leq a \leq b \leq L$, $I_o(.)$ comprises a zero-order modified Bessel function of the first kind, $\alpha_0$ such that $-\pi \leq \alpha_0 \leq \pi$ represents a mean AOA of a diffuse component, and $\kappa > 0$ controls a width of the diffuse component AOA.

According to experiments conducted at different locations and frequencies, the angle spread at a BS is generally small for macrocells in urban, suburban, and rural areas, most often less than 30°, which corresponds to $\kappa > 14.6$, and in some cases very small, less than 10° for example, which corresponds with $\kappa > 131.3$ (see, e.g., [5] and A. Abdi, M. Kaveh, "A versatile spatio-temporal correlation function for mobile fading channels with non-isotropic scattering, in Proc. IEEE Workshop Statistical Signal Array Processing, Pocono Manor, Pa., 2000, pp. 58-62, hereinafter "[6]"). In nonisotropic scattering environments, the distribution of diffuse AOA at antenna elements 14, $p(\Phi)$, may be approximated by a Gaussian distribution with mean $\alpha$ and variance $1/\kappa$ (see, e.g., [5]). Due to a small angle spread at antenna elements 14, it may be reasonable to assume $\alpha_0 = \alpha$.

According to an embodiment, and as shown in [2], a power spectral density (PSD) of $h_l(t)$ for an arbitrary AOA distribution $p(\Phi)$ in the two-dimensional plane, with a unit-gain isotropic receive antenna may be expressed in relation (4) as follows:

$$S_{h_l}(f) = \frac{P}{4\sqrt{f_D^2 - f^2}} [p(\phi) + p(-\phi)] \quad (4)$$

where $\Phi = \cos^{-}(f/f_D)$. By taking the derivative of $S_{h_l}(f)$ with respect to f and setting it to zero, assuming a Gaussian distribution with a mean $\alpha$ and variance $1/\kappa$ for $p(\Phi)$ provides relation (5) as follows:

$$\frac{1}{2\kappa} + \left(\left(\frac{f_D}{f}\right)^2 - 1\right)^{\frac{1}{2}} \left(\cos^{-1}\left(\frac{f}{f_D}\right) - \alpha\right) = 0 \quad (5)$$

According to an embodiment, relation (5) may incorporate the approximation $f \approx f_D \cos \alpha$, making the left term of relation (5) approach zero. To verify that $f \approx f_D \cos \alpha$, taking a second derivative of $S_{h_l}(f)$ with respect to f and letting $f = f_D \cos \alpha$ and $\alpha > \frac{1}{2} \cos^{-1}[(\kappa-2)/(\kappa+1)] \geq 18°$ provides relation (6) as follows:

$$-\frac{\sqrt{\kappa} \, (\kappa - 2 + (\kappa + 1)\cos(2\alpha) + 6\alpha\kappa\sin\alpha(1 - \cos\alpha))}{2\sqrt{2\pi} \, f_D^3 \sin^5 \alpha} < 0 \quad (6)$$

This observation may be further buttressed in particular conditions if received signal power comes from a direction with AOA a while a peak at singularity $f_D$ virtually disappears. In particular embodiments, a condition $\alpha > 18°$ may not be a concern since for $\alpha < 30°$, a single input, single output (SISO) estimator alone may perform well as shown in [1] at FIG. 2 therein. Accordingly, for a given subchannel $z_l(t)$, a technique similar to that proposed in [1] may be used to estimate $f_D \cos \alpha$ according to relation (7) as follows:

$$\hat{f}_{D,\alpha}^l = f_s \times \left| \underset{\mu_k}{\operatorname{argmax}} \hat{S}_{z_l}(\mu_k) \right| \quad (7)$$

where $f_s = N/T$ and $\hat{S}_{z_l}(\mu_k)$ represents a power spectral density of N-sample discrete-time version signal of $z_l(t)$ with duration T, $\{z_l[n]\}$ for $n=0$ to $N-1$, estimated according to a particular embodiment in relation (8) as follows:

$$\hat{S}_{z_l}(\mu_k) = \frac{1}{N} \left| \sum_{n=0}^{N-1} z_l[n] e^{-j2\pi\mu_k n} \right| \quad (8)$$

where $\mu_k = k/N$, $k = 1-N/2, \ldots, N/2$, and N is even.

By setting $\tau = 0$ in relation (3) and assuming a Gaussian distribution of AOA in a particular embodiment, a spatial cross-correlation function illustrated in [5] may be expressed in relation (9) as follows:

$$C_z((b-a)\Delta, 0) =$$
$$C_s((b-a)\Delta, 0) \approx \left(\frac{P}{K+1}\exp\left(-\frac{v^2\sin^2\alpha}{2\kappa}\right) + \frac{KP}{K+1}\right) e^{jv\cos\alpha} \quad (9)$$

However, this is merely an example of a spatial cross-correlation among characteristics of signals received at individual ones of an array of multiple antenna elements presented for the purpose of illustrating a particular embodiment. It should be observed from relation (9) that by setting $\tau = 0$ in relation (3) a spatial cross-correlation may be determined independently of temporal correlations among characteristics of signals received at individual ones of multiple antenna elements. Also, it should be understood that a spatial cross-correlation of characteristics of signals received at multiple antenna elements may be implemented using other techniques without deviating from claimed subject matter. In the presently illustrated embodiment, however, assuming that noise components are spatially independent, a mean AOA may be estimated according to relation (10) as follows:

$$\cos\hat{\alpha} \approx \frac{\angle \hat{C}_z(\Delta, 0)}{-2\pi\Delta} \quad (10)$$

where $\angle(.)$ denotes a phase of a complex number and $C_z(\Delta, 0)$ may be estimated according to relation (11) as follows:

$$\hat{C}_z(\Delta, 0) = \frac{1}{L-1} \sum_{l=1}^{L-1} \hat{C}_z^l(\Delta, 0) \quad (11)$$

Where $\hat{C}_z^l(\Delta, 0) = 1/N \sum_{l=1}^{L} z_l(n) z_{l+1}^*(n)$ comprises a "pulse pair" estimate of $C_z(\Delta, 0)$ (see, e.g., [3]). Finally, a speed s may be estimated from $f_D/\lambda$ as $f_D$ may be estimated according to relation (12) as follows:

Where $\hat{C}_z^l(\Delta, 0) = 1/N \sum_{l=1}^{L} z_l(n) z_{l+1}^*(n)$ comprises a "pulse pair" estimate of $C_z(\Delta, 0)$ (see, e.g., [3]). Finally, a speed s may be estimated from $f_D/\lambda$ as $f_D$ may be estimated according to relation (12) as follows:

$$\hat{f}_D = \frac{\hat{f}_{D,\alpha}}{\cos\hat{\alpha}}, \quad (12)$$
$$\text{where } \hat{f}_{D,\alpha} = \frac{1}{L} \sum_{l=1}^{L} \hat{f}_{D,\alpha}^l.$$

Here, relation (12) provides an estimator for speed based, at least in part, on a combined frequency made up of component estimates of signal frequencies received at antenna elements. Such an estimator may provide a spatial mobile speed estimator which estimates speed of a mobile object based, at least in part, on a spatial cross-correlation of among characteristics of signals received at individual ones of antenna elements. According to an embodiment, although claimed subject matter is not limited in this respect, an estimate derived from a spatial mobile speed estimator may be compared against a threshold derived from a Gaussian statistical model to determine the quality of the estimate. Here, such a threshold may be based, at least in part, on multiple estimates in real time. Alternatively, such a threshold may be determined empirically from a quantification of noise sources that may affect a particular implementation of a spatial mobile speed estimator.

In the particular embodiment illustrated in relation (12), a combined frequency may comprise an average of frequencies received at antenna elements. In other embodiments, such a combined frequency may comprise a weighted average of frequencies of signals received at antenna elements. However, these are merely an example of how frequencies of signals received at different antenna elements may be combined for estimating a speed of a moving object and claimed subject matter is not limited in this respect.

Performance of an estimator derived substantially according to relation (12) may be evaluated substantially according to a root mean squared error (RMSE) criterion as shown below substantially according to relation (13):

$$\left\{E\left[(\hat{f}_D - f_D)^2\right]\right\}^{\frac{1}{2}} = \left\{\text{Var}\ [\hat{f}_D] + \left(E[\hat{f}_D] - f_D\right)^2\right\}^{\frac{1}{2}} \quad (13)$$

where the first term in the right-hand side comprises a variance and the second term represents a bias of the estimator. In a sequel, RMSE bounds of $\hat{f}_D$ may be determined by first considering a case that an estimate of $\hat{C}_z^l(\Delta, 0)$ provides a maximum likelihood "pulse-pair" estimate, where N temporally independent spatial observations are assumed. Based on [3], a mean and variance of $\sphericalangle \hat{C}_z^l(\Delta, 0)$ may be given by relations (14) and (15) as follows:

$$E\left[\sphericalangle \hat{C}_z^l(\Delta, 0)\right] = \sphericalangle C_z(\Delta, 0) + O(N^{-2}) \quad (14)$$

and $$\text{Var}\left[\sphericalangle \hat{C}_z^l(\Delta, 0)\right] = \frac{|C_z(0, 0)|^2 - |C_z(\Delta, 0)|^2}{2N|C_z(0, 0)|^2} + O(N^{-2}) \quad (15)$$

$$= \frac{1}{2N|C_z(\Delta, 0)|^2} - \frac{1}{2N} + O(N^{-2}),$$

In a particular example, it can be shown that $|C_z(\Delta, 0)| \geq 0.713$ where equality occurs at about $\kappa=14.6$ and $\alpha=\pi/2$, consequently $\text{Var}\ [\sphericalangle \hat{C}_z^l(\Delta, 0)] \to 0$ for large N as suggested in [4]. Moreover, an average of $\sphericalangle \hat{C}_z^l(\Delta, 0)$ over L may further decrease a variance of $\sphericalangle \hat{C}_z^l(\Delta, 0)$. Therefore, $\cos\hat{a} = \cos\alpha$ approaching probability one as N becomes large. Additionally, it may be observed that when if T and N are large enough, this conclusion applies to the general case where N pairs of observations are not independent since large enough M (M<N) temporally independent pairs of observations are able to be included in an average operation. Then one obtains for a speed estimate and associated variance according to relations (16) and (17) as follows:

$$E[\hat{f}_D] = \frac{1}{\cos\hat{\alpha}} E[\hat{f}_{D,\alpha}] = \frac{1}{\cos\alpha} E[\hat{f}_{D,\alpha}^l] \quad (16)$$

and $$\frac{\text{Var}\ [\hat{f}_{D,\alpha}^l]}{L\cos^2\alpha} \leq \text{Var}\ [\hat{f}_D] \leq \frac{\text{Var}\ [\hat{f}_{D,\alpha}^l]}{\cos^2\alpha} \quad (17)$$

Where lower and upper bounds correspond to a case where $\{\hat{f}_{D,\alpha}^l\}_{l=1}^L$ are identically and independently distributed and identically fully correlated, respectively. $E[\hat{f}_{D,\alpha}^l]$ and $\text{Var}[\hat{f}_{D,\alpha}^l]$ may be calculated as shown in [1], which applies to a Gaussian noisy Rayleigh fading channel. Additionally, an RMSE lower and upper bounds for $L \geq 2$ may be expressed in relations (18) and (19), respectively, as follows:

$$\text{RMSE} \geq \left\{\frac{\text{Var}\ [\hat{f}_{D,\alpha}^l]}{L\cos^2\alpha} + \left(\frac{E[\hat{f}_{D,\alpha}^l]}{\cos\alpha} - f_D\right)^2\right\}^{\frac{1}{2}} \quad (18)$$

and $$\text{RMSE} \leq \left\{\frac{\text{Var}\ [\hat{f}_{D,\alpha}^l]}{\cos^2\alpha} + \left(\frac{E[\hat{f}_{D,\alpha}^l]}{\cos\alpha} - f_D\right)^2\right\}^{\frac{1}{2}} \quad (19)$$

It should be observed that, in this particular implementation, RMSE is closer to an upper bound, as $\{\hat{f}_{D,\alpha}^l\}_{l=1}^L$ are correlated as shown in simulation results discussed below.

Figure 2:
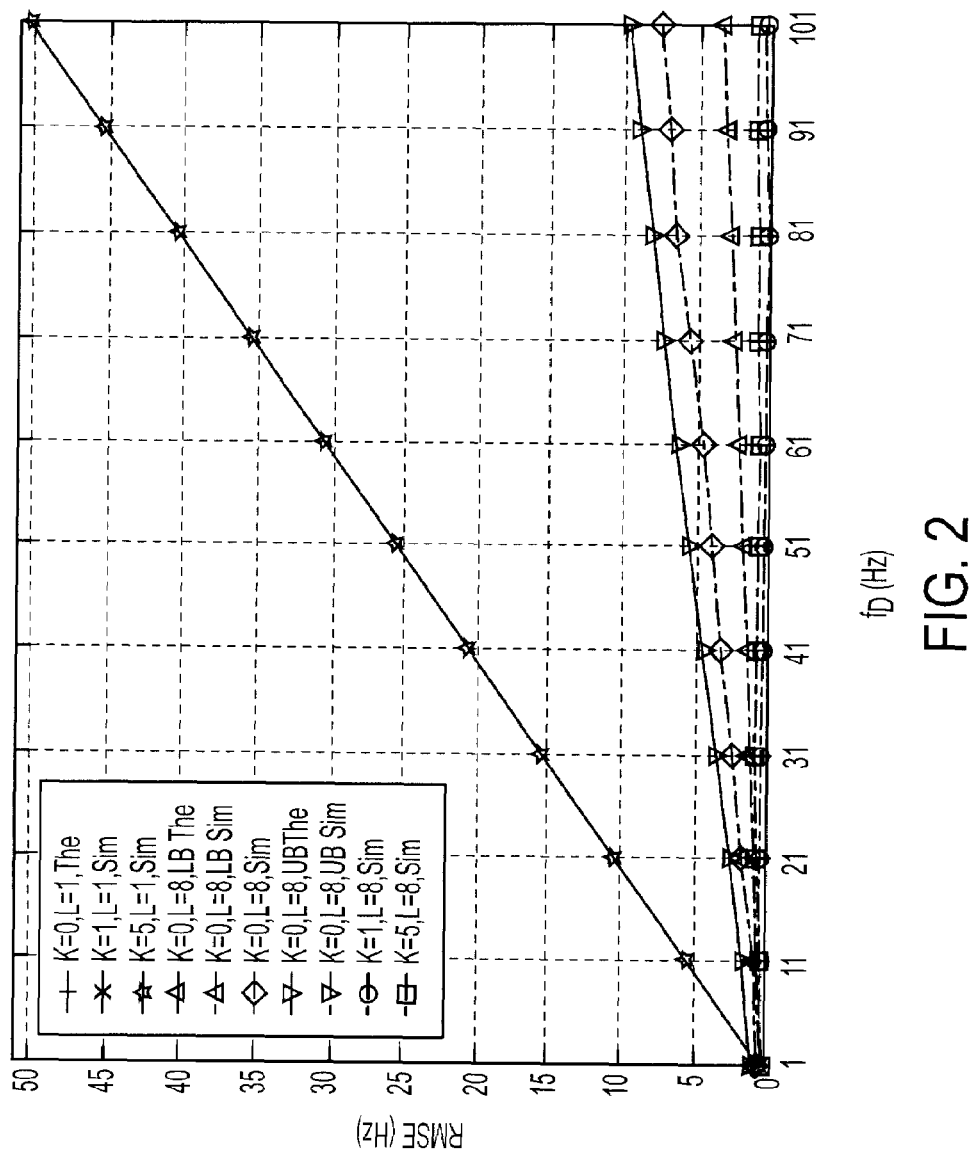
FIG. 2 is a graph plotting estimation error versus Doppler frequency.
Figure 3:
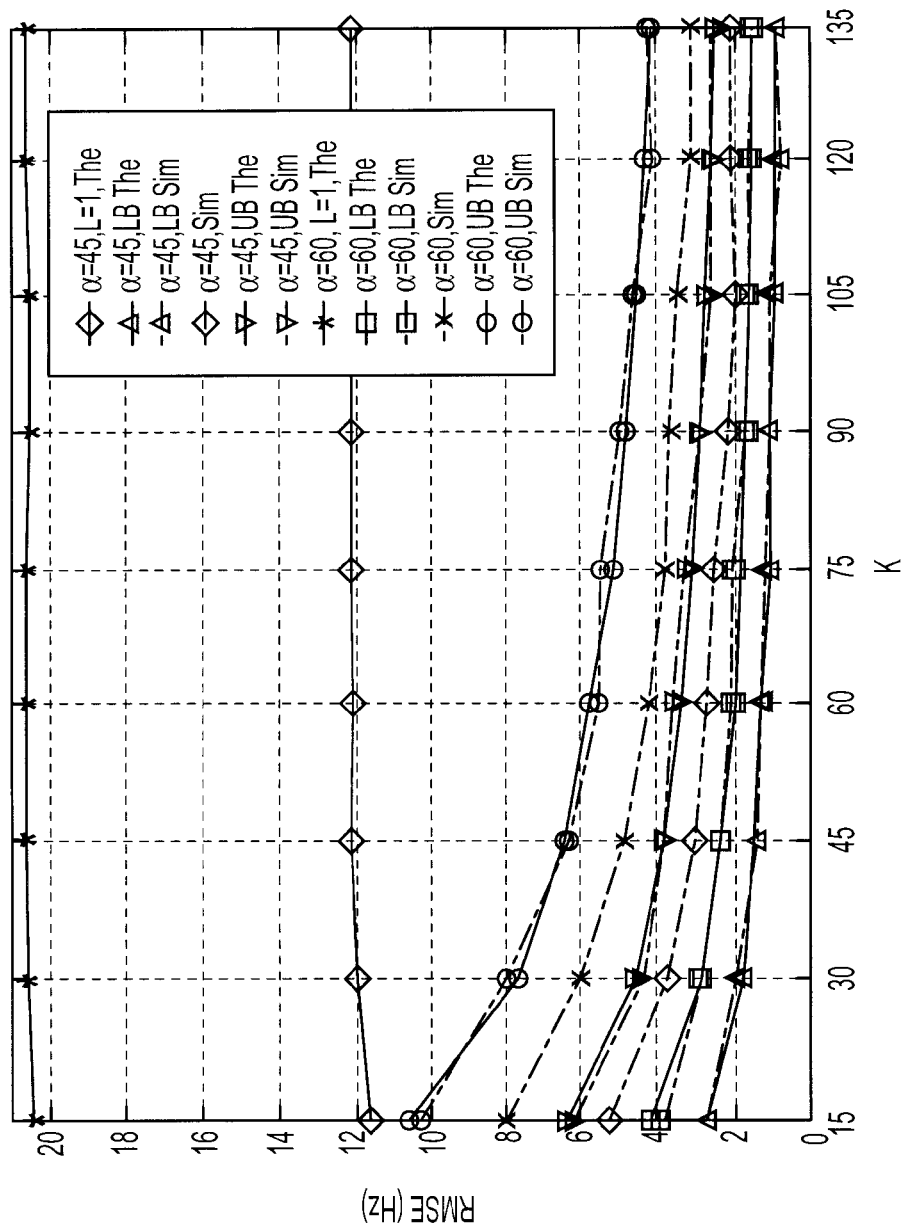
FIG. 3 is a graph plotting effects of varying system parameters on performance for a given Doppler frequency.
Figure 4:
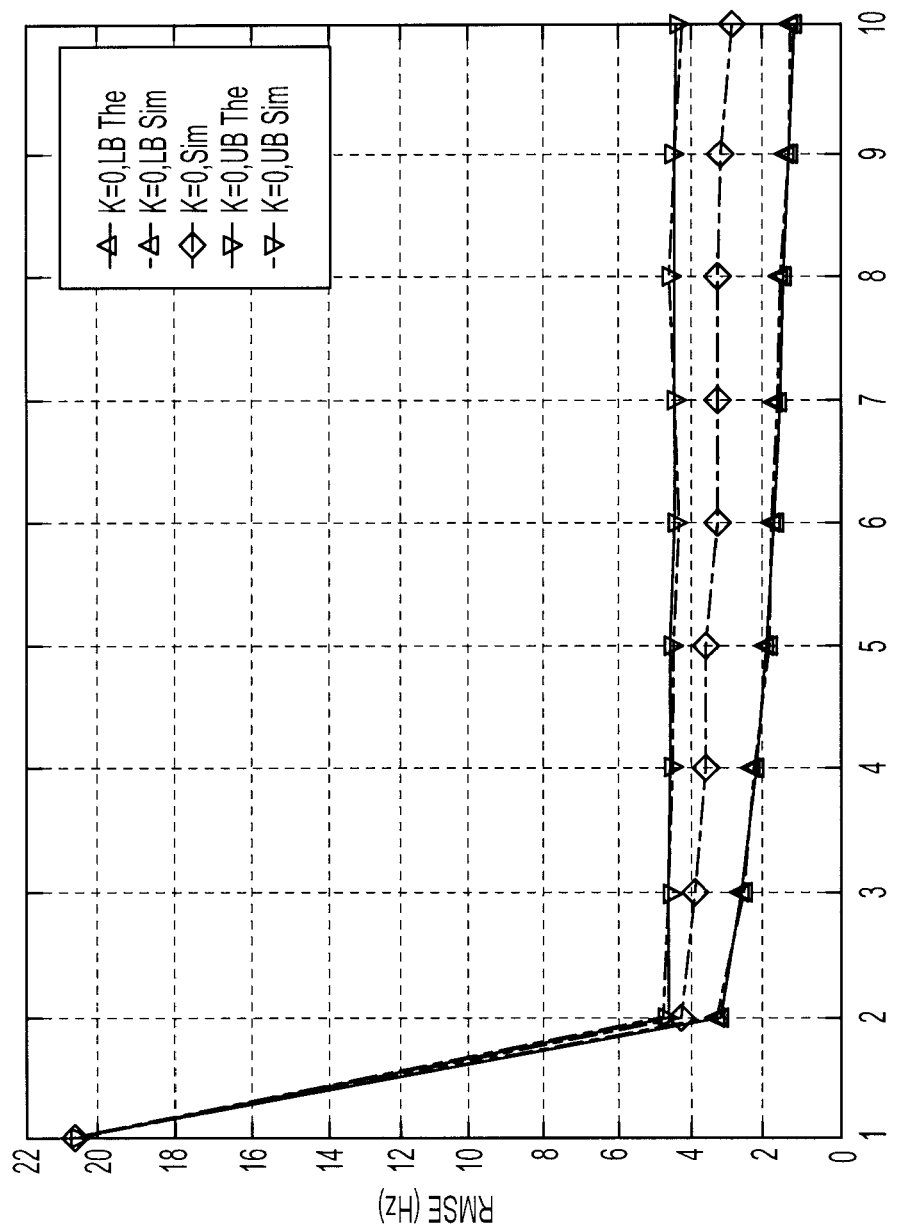
FIG. 4 is a graph plotting estimation error with respect to a number of antenna elements according to an embodiment.

Performance bounds of the estimator illustrated above may be validated using Monte Carlo simulation techniques, while investigating effects of nonisotropic parameters such as, for example, $\kappa$ and $\alpha$, Ricean factor K, and number of antenna elements L in an antenna array. In each simulation, except specified otherwise, 500 independent realizations of L=8 space-time correlated complex Gaussian processes for scattering scenario ($\kappa=100$, $\alpha=60°$) are generated, with N=256 complex samples per realization, over T=1 second. For each channel, the noise is Gaussian with a 10 dB signal-noise-ratio (SNR) and the receiver bandwidth is fixed at 101 Hz. FIG. 2 illustrates the estimation error versus Doppler frequency, for both Rayleigh and Ricean channel. It may be seen that the analytic performance bounds are in good agreement with the simulation. FIG. 2 also shows that Ricean factor may decrease estimation error because the LOS may make the peak of PSD stronger and estimate of a more accurate. In comparison with a single input, single output (SISO) estimator (L=1) applied directly, this particular estimator embodiment exhibits good performance. The effects of $\kappa$ and $\alpha$ on the performance for a given $f_D=41$ Hz is shown in FIG. 3. The estimation error decreases as $\kappa$ increases or $\alpha$ becomes smaller, and analytic and simulated bounds fit well. FIG. 4 illustrates the estimation error with respect to the number of antenna elements L. As shown for a particular embodiment, performance may improve as L increases.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method comprising:
   receiving at an array of multiple antenna elements a radio frequency signal transmitted by a moving object;
   estimating a speed of said moving object based, at least in part, on a spatial cross-correlation among characteristics of signals received at individual ones of said multiple antenna elements; and
   comparing the estimated speed against a threshold to determine the quality of the estimated speed.

2. The method of claim 1, wherein said radio frequency signal is transmitted by a single antenna element.

3. The method of claim 1, wherein said estimating said speed of said moving object further comprises estimating an angle of arrival of said moving object based, at least in part, on said spatial cross-correlation.

4. The method of claim 1, wherein said estimating said speed of said moving object further comprises:
   estimating frequencies of said signals received at said individual ones of said multiple antenna elements; and
   combining said estimated frequencies to provide a combined frequency.

5. The method of claim 4, wherein said combining said estimated frequencies comprises averaging said estimated frequencies.

6. The method of claim 4, wherein said combining said estimated frequencies comprises determining a weighted average of said estimate frequencies.

7. The method of claim 1, wherein said multiple antenna elements comprise omnidirectional antenna elements having a substantially uniform gain.

8. The method of claim 7, wherein said multiple antenna elements are uniformly spaced in a substantially linear array.

9. The method of claim 1, wherein said spatial cross-correlation further comprises a spatial-temporal cross-correlation.

10. An apparatus comprising:
  means for receiving at an array of multiple antenna elements a radio frequency signal transmitted by a moving object;
  means for estimating a speed of said moving object based, at least in part, on a spatial cross-correlation among characteristics of signals received at individual ones of said multiple antenna elements; and
  means for comparing the estimated speed against a threshold to determine the quality of the estimated speed.

11. The apparatus of claim 10, wherein said means for estimating said speed of said moving object further comprises means for estimating an angle of arrival of said moving object based, at least in part, on said spatial cross-correlation.

12. The apparatus of claim 10, wherein said means for estimating said speed of said moving object further comprises:
  means for estimating frequencies of said signals received at said individual ones of said multiple antenna elements; and
  means for combining said estimated frequencies to provide a combined frequency.

13. The apparatus of claim 10, wherein said spatial cross-correlation further comprises a spatial-temporal cross-correlation.

14. An article comprising:
  a storage medium comprising machine-readable instructions stored thereon which, if executed, are adapted to cause a computing platform to:
  obtain information representative of characteristics of a radio frequency signal received at an array of multiple antenna elements, said radio frequency signal being transmitted by a moving object;
  estimate a speed of said moving object based, at least in part, on a spatial cross-correlation among said characteristics of signals received at individual ones of said multiple antenna elements; and
  compare the estimated speed against a threshold to determine the quality of the estimated speed.

15. The article of claim 14, wherein said instructions, if executed, are further adapted to cause said computing platform to estimate said speed of said moving object based, at least in part, on an estimate of an angle of arrival of said moving object based, at least in part, on said spatial cross-correlation.

16. The article of claim 14, wherein said instructions, if executed, are further adapted to cause said computing platform to:
  estimate frequencies of said signals received at said individual ones of said multiple antenna elements; and
  combine said estimated frequencies to provide a combined frequency.

17. The article of claim 14, wherein said spatial cross-correlation further comprises a spatial-temporal cross-correlation.

18. A system comprising:
  a base station adapted to communicate with a mobile station over a wireless communication link, said base station comprising an array of multiple antenna elements;
  a digital signal processor adapted to estimate characteristics of a signal transmitted by said mobile station and received at individual ones of said multiple antenna elements;
  a computing platform to estimate a speed of said mobile station based, at least in part on a spatial cross-correlation among said estimated characteristics and to compare the estimated speed against a threshold to determine the quality of the estimated speed; and
  a gateway adapted to provide a subscriber at said mobile station access to the Internet through said base station.

19. The system of claim 18, wherein said multiple antenna elements comprise omnidirectional antenna elements having a substantially uniform, gain.

20. The system of claim 19, wherein said multiple antenna elements are uniformly spaced in a substantially linear array.

21. The system of claim 18, wherein said spatial cross-correlation further comprises a spatial-temporal cross-correlation.

22. A method of estimating a speed of a mobile wireless transmitter comprising:
  receiving signals transmitted by said transmitter at multiple antennae array of a receiver;
  processing said received signals substantially in accordance with a spatial mobile speed estimator;
  estimating the speed of said transmitter based at least in part upon said processing; and
  comparing the estimated speed against a threshold to determine the quality of the estimated speed.

23. The method of claim 22, wherein said transmitter is incorporated into at least one of a cell phone, a personal digital assistant, or a computing platform.

24. The method of claim 22, wherein said estimating the speed of said transmitter comprises estimating a maximum Doppler frequency.

25. The method of claim 22, wherein said multiple antennae array comprises a substantially linear antenna array including more than one antenna element.

26. An apparatus for estimating a speed of a mobile wireless transmitter comprising:
  means for receiving signals transmitted by said transmitter at multiple antennae array of a receiver;
  means for processing said received signals substantially in accordance with a spatial mobile speed estimator;
  means for estimating the speed of said transmitter based at least in part upon said processing; and
  means for comparing the estimated speed against a threshold to determine the quality of the estimated speed.

27. The apparatus of claim 26, wherein said transmitter is incorporated into at least one of a cell phone, a personal digital assistant, or a computing platform.

28. The apparatus of claim 26, wherein said means for estimating the speed of said transmitter comprises means for estimating a maximum Doppler frequency.

29. An article comprising:
  a storage medium comprising machine-readable instructions stored thereon which, if executed, are adapted to cause a computing platform to:

process signals received from a transmitter at an array of multiple antenna elements substantially in accordance with a spatial mobile speed estimator;

estimate the speed of said transmitter based at least in part upon said processing; and compare the estimated speed against a threshold to determine the quality of the estimated speed.

30. The article of claim 29, wherein said instructions, if executed, are further adapted to cause said computing platform to estimate a maximum Doppler frequency associated with said transmitter.

31. A system including a base station adapted to communicate with a mobile station over a wireless communication link, said base station comprising:

a multiple antennae array;

a digital signal processor adapted to process signals received from said mobile station at said array in accordance with a spatial mobile speed estimator; and a computing platform adapt to estimate a speed of said mobile station based, at least in part on said spatial mobile speed estimator and to compare the estimated speed against a threshold to determine the quality of the estimated speed, wherein said base station is further adapted to communicate with said mobile station through an Internet gateway.

32. The system of claim 31, wherein said mobile station comprises at least one of a cell phone, a personal digital assistant or a computing platform.

33. The system of claim 31, wherein said multiple antennae array comprises a substantially linear antenna array including more than one antenna element.

34. A method of estimating a speed of a mobile wireless transmitter comprising:

receiving signals transmitted by said transmitter at multiple antennae array of a receiver;

processing said received signals substantially in accordance with a spatial mobile speed estimator;

estimating the speed of said transmitter based at least in part upon said processing; and comparing said estimated speed with a threshold based, at least in part, on a Gaussian statistical model.

35. An article comprising:

a storage medium comprising machine-readable instructions stored thereon which, if executed, are adapted to cause a computing platform to:

process signals received from a transmitter at an array of multiple antenna elements substantially in accordance with a spatial mobile speed estimator; and estimate the speed of said transmitter based at least in part upon said processing, wherein said instructions, if executed, are further adapted to cause said computing platform to compare said estimated speed with a threshold based, at least in part, on a Gaussian statistical model.

* * * * *